United States Patent
Holz et al.

(10) Patent No.: US 6,525,860 B1
(45) Date of Patent: Feb. 25, 2003

(54) ELECTRONICALLY VARIABLE LIGHT ATTENUATOR

(75) Inventors: Michael Holz, Newton; David L. Corkum, Attleboro, both of MA (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/574,357

(22) Filed: May 18, 2000

(51) Int. Cl.[7] .............................. G02F 1/03; G02F 1/07; G02F 1/1337
(52) U.S. Cl. ........................................ 359/251; 349/129
(58) Field of Search ................................ 359/250, 251, 359/252, 253, 254; 349/129

(56) References Cited

U.S. PATENT DOCUMENTS

| | | | |
|---|---|---|---|
| 4,878,742 A | 11/1989 | Ohkubo et al. | 349/201 |
| 5,253,033 A | 10/1993 | Lipchak et al. | 356/5 |
| 5,807,498 A | * 9/1998 | Gibbons et al. | 252/299.4 |
| 5,825,448 A | 10/1998 | Bos et al. | 349/128 |
| 5,965,691 A | * 10/1999 | Gibbons et al. | 528/353 |
| 6,040,884 A | * 3/2000 | Yasuda et al. | 349/129 |

FOREIGN PATENT DOCUMENTS

FR    2 679 048    1/1993

OTHER PUBLICATIONS

D.–S. Seo, H. Matsuda, J. Ishizaki, Y. Iimura, and S. Kobayashi, "Surface alignment of Liquid Crystals in LCDs," SID 93 Digest bf 24 (1993) 953–956.

M. J. O'Callaghan and M. A. Handschy, "Diffractive ferroelectric liquid–crystal shutters for unpolarized light," Opt. Lett. 16 (1991) 770–772.

S. Kaneko, Y. Hirai, and K Sumiyoshi, "Wide–viewing–angle improvements for AMLCDs," SID 93 Digest bf 24 (1993) 265–268.

S. G. Anderson, "Review and Forecast of Laser Markets: 1994," Laser Focus Jan. 1994, 62–76.

Newport Catalog (1992) B–48.

* cited by examiner

*Primary Examiner*—Ricky Mack
(74) *Attorney, Agent, or Firm*—Daly, Crowley & Mofford, LLP

(57) ABSTRACT

An electronically variable light attenuator and method for electronically attenuating light. The attenuator has an array of liquid crystal regions. The regions in a first set thereof are interspersed with the regions in a second set thereof. The array is adapted to receive a beam of light directed along an axis. A pair of electrodes is provided. At least one of the sets of regions is disposed between the electrodes. The regions in the first set are configured to produce a first diffraction pattern in response to the received light and the regions in the second set are configured to produce a second diffraction pattern in response to the received light. The pair of electrodes are arranged to enable the first and second diffraction patterns to combine with a degree of interference along an axis selected in accordance with an electric field produced between the pair of electrodes and through the at least one of the sets of regions. The array degree of interference is greatest in the absence of the electric field. With such an arrangement, a relatively low cost, high power, fail-safe, electronically variable light attenuator is provided.

18 Claims, 13 Drawing Sheets

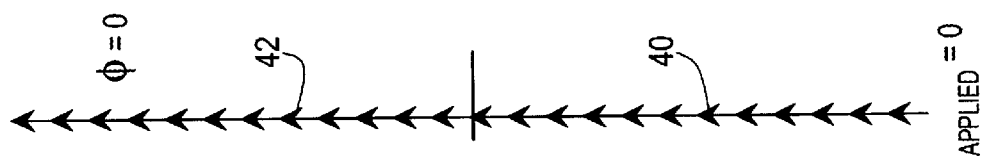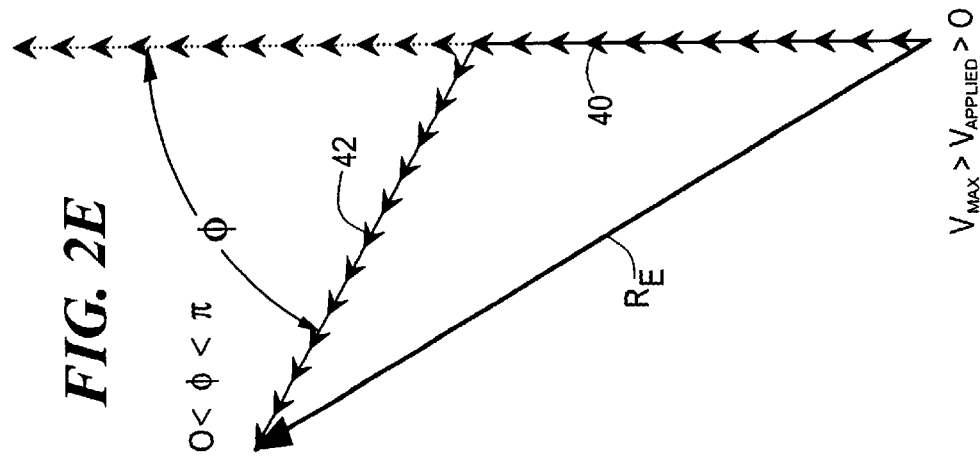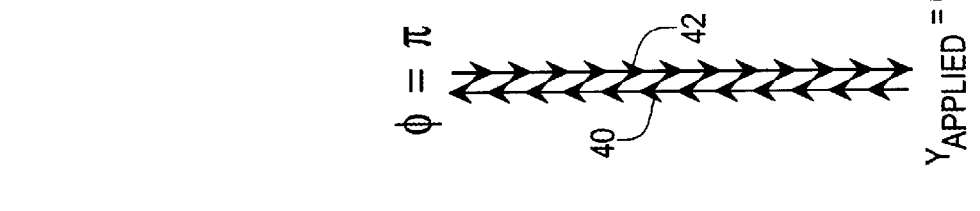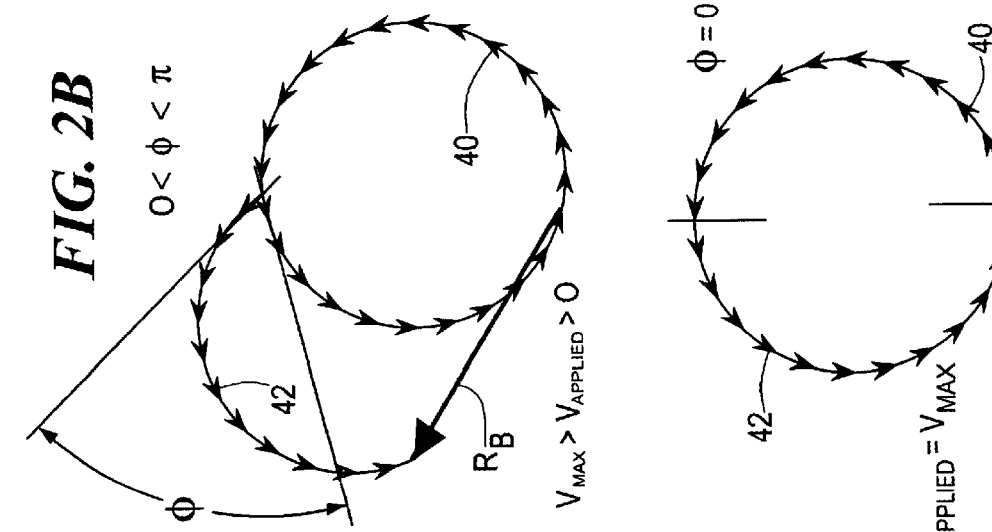

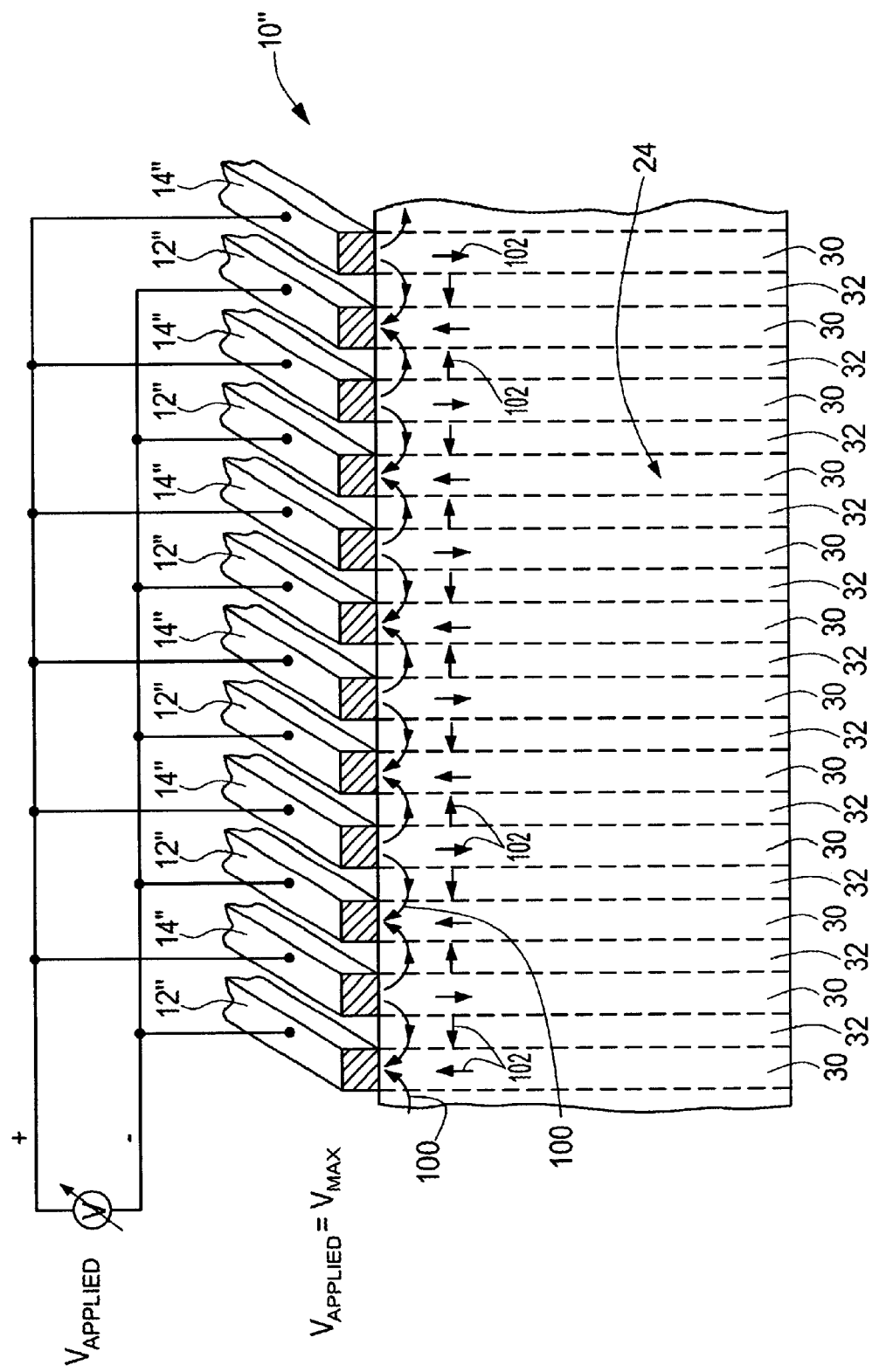

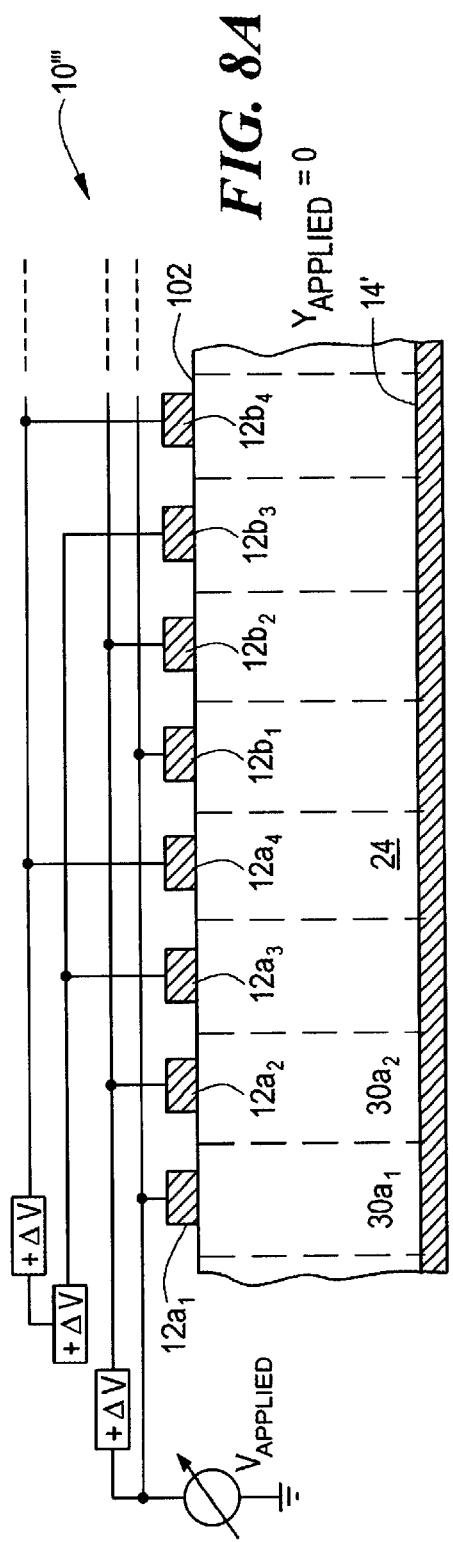
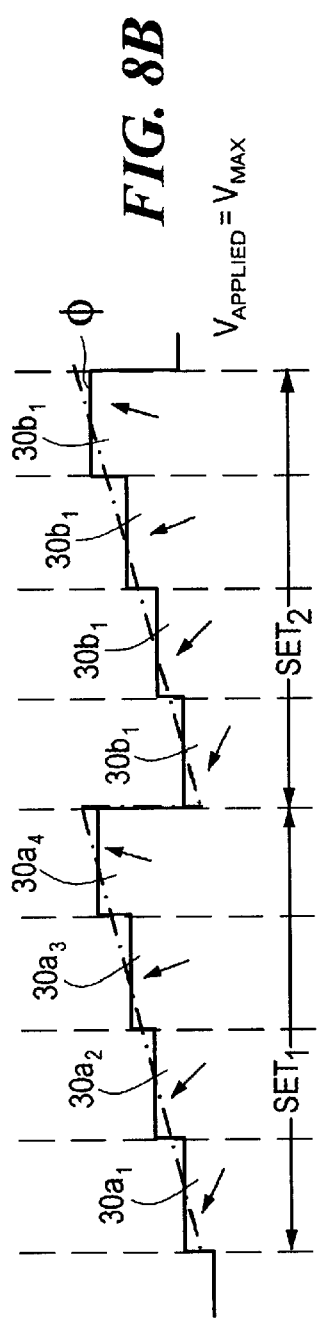
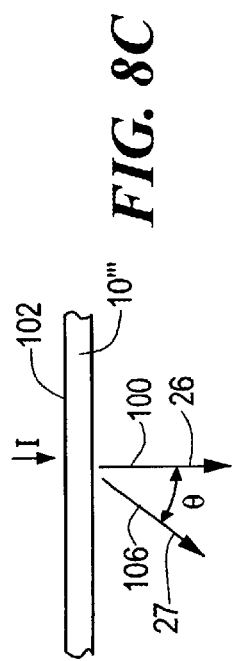
FIG. 8A
FIG. 8B
FIG. 8C

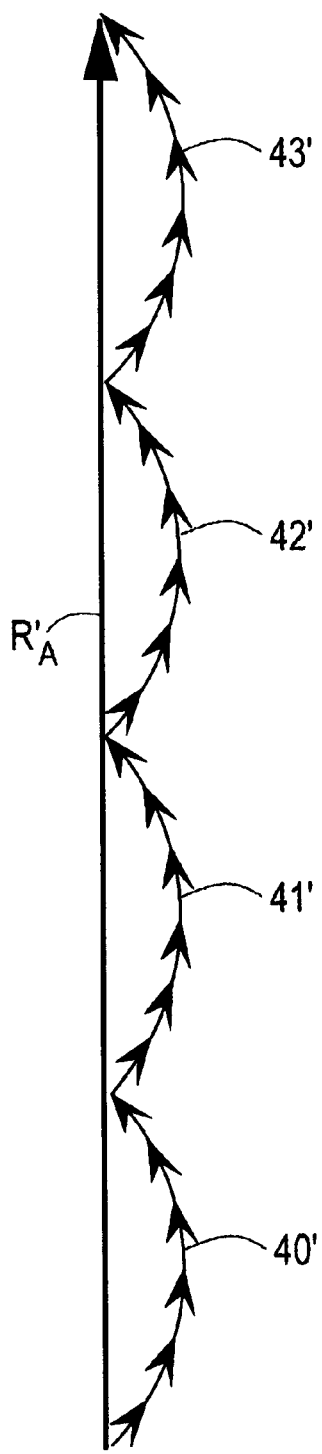
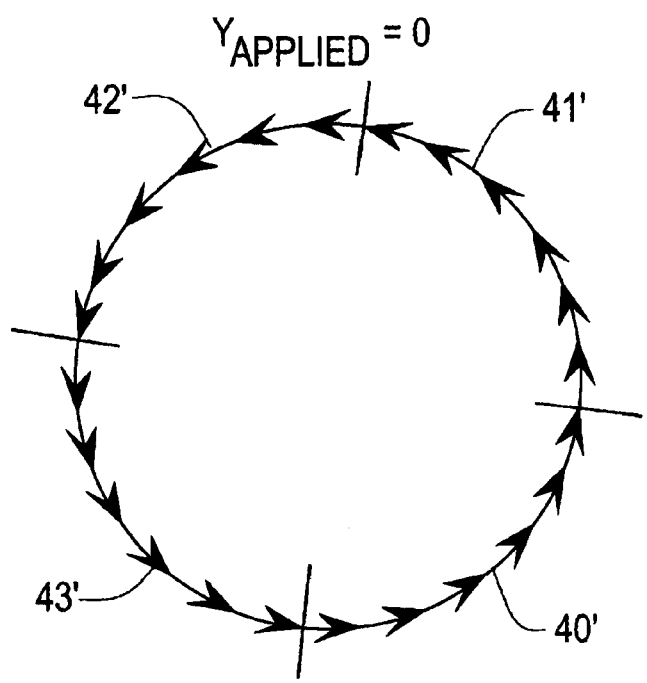
FIG. 9A
FIG. 9C

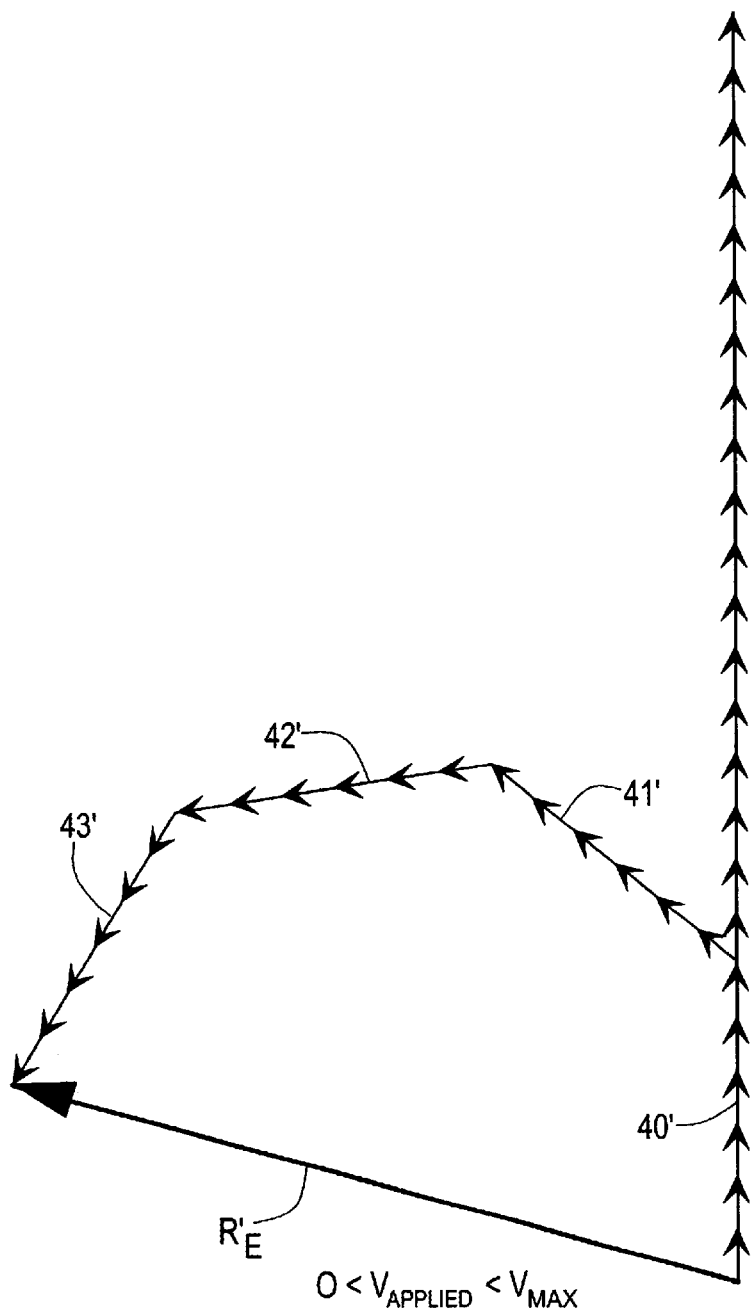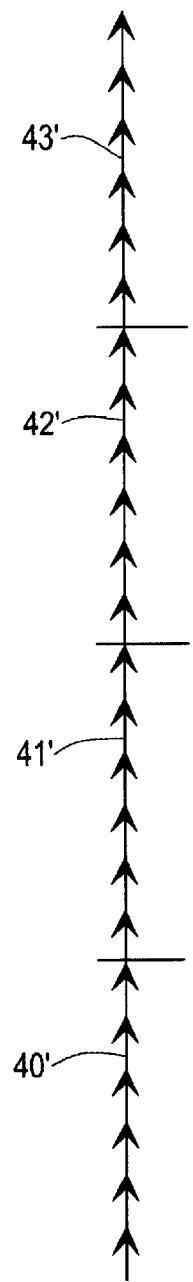
*FIG. 9E*
*FIG. 9F*

ELECTRONICALLY VARIABLE LIGHT ATTENUATOR

BACKGROUND OF THE INVENTION

This invention relates generally to light attenuators and more particularly to electronically variable light attenuators.

As is known in the art, variable light attenuators are used in a wide variety of applications. One electronically variable light attenuator includes a polarizer, an electronic polarization rotator, and an analyzer. The light is first polarized by the polarizer to a particular orientation. The polarization rotator is adapted to rotate the polarization of the light passing through the rotator about the axis along which the light enters the attenuator. The analyzer is disposed in the path of the light exiting the rotator. Thus, for example, at one extreme, say when there is no voltage applied to the rotator, with the polarizer and the analyzer having the same polarization alignment, the light passes substantially unattenuated through the analyzer. At the other extreme, as when the polarizer rotates the polarization of the light entering it by ninety degrees relative to the analyzer, the light exiting the analyzer is substantially totally attenuated. An intermediate voltage will thus provide a degree of attenuation between these two extremes.

While such an arrangement may be useful in some applications, high-quality polarizers and attenuators having apertures of about one centimeter or larger are relatively expensive and have a relatively limited power handling capability.

SUMMARY OF THE INVENTION

In accordance with one feature of the invention, an electronically variable light attenuator is provided having an array of liquid crystal regions. The regions in a first set thereof are interspersed with the regions in a second set thereof. The array is adapted to receive a beam of light directed along an axis. A pair of electrodes is provided. At least one of the sets of regions is disposed between the pair of the electrodes. The regions in the first set are configured to produce a first diffraction pattern in response to the received light and the regions in the second set are configured to produce a second diffraction pattern in response to the received light. The pair of electrodes are arranged to enable the first and second diffraction patterns to combine with a degree of interference along an axis selected in accordance with an electric field produced through at least one of the sets liquid crystal regions disposed between the pair of electrodes.

With such an arrangement, a relatively low cost, high power electronically variable light attenuator is provided.

In accordance with another feature of the invention, the array degree of interference is greatest in the absence of the electric field.

With such an arrangement, a fail-safe attenuator is provided, because in the absence of a voltage between the electrodes the attenuator provides maximum attenuation. Such is desirable for example in a medical application where a laser light source is used during surgery. A power failure will, with such an attenuator, prevent high power laser light from impinging upon a patient.

In accordance with still another feature of the invention, the degree of interference is independent of the polarization of the received light.

With such an arrangement the requirement for costly polarizers or special laser axis requirement is eliminated.

In one embodiment, an electronically variable light attenuator is provided having an array of liquid crystal regions. The regions comprise a plurality of sets thereof, each one of the sets having a plurality of subsets of the regions, such subsets being interspersed within the set thereof. The array is adapted to receive a beam of light directed along an axis. A pair of electrodes is provided with at least one of the subsets of liquid crystal regions being disposed between the pair of electrodes. The regions in the subsets of each set thereof are configured to produce a corresponding diffraction pattern in response to the received light. The pair of electrodes are arranged to enable the corresponding diffraction pattern of the subsets to combine with a degree of interference along an axis selected in accordance with an electric field produced between the pair of electrodes.

With such embodiment, a relatively low cost and compact high power electronically variable light attenuator is provided.

In accordance with one embodiment of the invention, an electronically variable light attenuator is provided having an array of liquid crystal regions. The regions in a first set thereof are interspersed with the regions in a second set thereof. The array is adapted to receive a beam of light directed along an axis. A pair of electrodes is provided. At least one of the sets of liquid crystal regions is disposed between the electrodes. The regions in the first set are configured to produce a first diffraction pattern in response to the received light and the regions in the second set are configured to produce a second diffraction pattern in response to the received light. The pair of electrodes are arranged to enable the first and second diffraction patterns to combine with a degree of interference along an axis selected in accordance with an electric field produced through the at least one of the sets liquid crystal regions disposed between the pair of electrodes. The regions comprise liquid crystal molecules elongated along a director field axis. The director field axis of the molecules in the first set is orthogonal to the director field axis of the molecules in the second set.

In accordance with one feature, the projection of the director field axis of the molecules onto a plane orthogonal to the light propagation in the first set and the projection of the director field axis of the molecules onto the same plane in the second set are both orthogonal to the direction of the received light over a range of electric field strengths between the electrodes.

In accordance with another feature, the director field axis of the molecules in the first set of regions rotates in a first plane defined by an initial orientation and the light propagation direction as an electric field between the electrodes varies in strength and wherein the director field axis of the molecules in the second set of regions rotate in a second plane orthogonal to the first plane as the electric field between the electrodes varies in strength.

In accordance with one embodiment, at zero electric field, the regions in the first set provide an $n\pi$ phase shift to the received light relative to the phase shift provided to the received light by the regions in the second set, where n is an odd integer.

In accordance with one feature, the regions in the first set provide an $n\pi$ phase shift to the received light relative to the phase shift provided to the received light by the regions in the second set, where n is an odd integer in the absence of an electric field between the pair of electrodes for one polarization of the light, while at the same time the regions in the first set provide an $-n\pi$ phase shift to the received light relative to the phase shift provided to the received light by the regions in the second set in the absence of an electric field between the pair of electrodes for the orthogonal polarization of the light, where n is an odd integer.

In accordance with still another feature of the invention, a method is provided for electronically varying light attenuation. The method includes providing a pair of electrodes. The regions in a first set of liquid crystal regions are interspersed with a second set of liquid crystal regions. Both sets of liquid crystal regions are disposed between the pair of electrodes. The array is adapted to receive a beam of light directed along an axis. The regions in the first set are configured to produce a first diffraction pattern in response to the received light and the regions in the second set are configured to produce a second diffraction pattern in response to the received light. An electric field between the electrodes and through both sets of regions is varied producing the first and second diffraction patterns with a varying degree of interference along the axis.

In one embodiment, the array degree of interference produced is greatest in the absence of the electric field.

In one embodiment, the degree of interference produced is independent of the polarization of the received light. The regions are molecules having an elongated along a director field axis. The director field axis of the molecules in the first set is orthogonal to the director field axis of the molecules in the second set.

In accordance with yet another feature of the invention, a method is provided for electronically varying light attenuation. The method includes providing a pair of electrodes. A first set of liquid crystal regions is interspersed with the regions in a second set thereof. At least one of the sets of liquid crystal regions is disposed between the pair of electrodes. The array is adapted to receive a beam of light directed along an axis. The regions in the first set are configured to produce a first diffraction pattern in response to the received light and the regions in the second set are configured to produce a second diffraction pattern in response to the received light. An electric field between the electrodes and through the at least one of the sets of regions is varied producing the first and second diffraction patterns with a varying degree of interference along the axis. The regions are molecules having an elongated along a director field axis. The director field axis of the molecules in the first set rotates with respect to the stationary director field axis of the molecules in the second set.

In accordance with one embodiment, the director field axis of the molecules in the first set and the director field axis of the molecules in the second set are both oriented orthogonal to the direction of the received light. The director field axis of the molecules in the first set and the director field axis of the molecules in the second set are both oriented orthogonal to the direction of the received light over a range of electric field strengths between the electrodes.

In accordance with one embodiment, the regions in the first set provide an $n\pi$ phase shift to the received light relative to the phase shift provided to the received light by the regions in the second set, where n is an odd integer. The regions in the first set provide an $n\pi$ phase shift to the received light relative to the phase shift provided to the received light by the regions in the second set, where n is an odd integer in the absence of an electric field between the pair of electrodes.

BRIEF DESCRIPTION OF THE DRAWING

These and other features of the invention, as well as the invention itself, will become more readily apparent from the following detailed description when read together with the accompanying drawings, in which:

FIGS. 2A–2F are diagrams showing resultant optical fields at various applied voltages for the attenuator of FIG. 1, FIGS. 2A–2C showing the resultant optical field diffracted an at acute angle from the direction of light propagation, FIG. 2A with an applied voltage of V=0, FIG. 2B with an applied voltage V between zero and $V_{MAX}$, and FIG. 2C with an applied voltage V of $V_{MAX}$; FIGS. 2D–2F showing the resultant optical field along the direction of light propagation, FIG. 2D with an applied voltage of V=0, FIG. 2E with an applied voltage V between zero and $V_{MAX}$, and FIG. 2F with an applied voltage V of $V_{MAX}$;

FIG. 7 is a diagram of an electronically controllable light attenuator according to still another embodiment of the invention; and FIG. 8A is a diagram of an electronically controllable light attenuator according to still another embodiment of the invention;

FIGS. 8B and 8C are diagrams useful in understanding the operation of the attenuator of FIG. 8A;

FIGS. 9A–9F are diagrams showing resultant optical fields at various applied voltages for the attenuator of FIG. 8, FIGS. 9A–9C showing the resultant optical field diffracted an at acute angle from the direction of light propagation, FIG. 9A with an applied voltage of V=$_{MAX}$, FIG. 9B with an applied voltage V between zero and $V_{MAX}$, and FIG. 9C with an applied voltage V=0; FIGS. 9D–9F showing the resultant optical field along the direction of light propagation, FIG. 9D with an applied voltage of V=$V_{MAX}$, FIG. 9E with an applied voltage V between zero and $V_{MAX}$, and FIG. 9F with an applied voltage V of zero;

DESCRIPTION OF THE PREFERRED EMBODIMENTS

Figure 1:
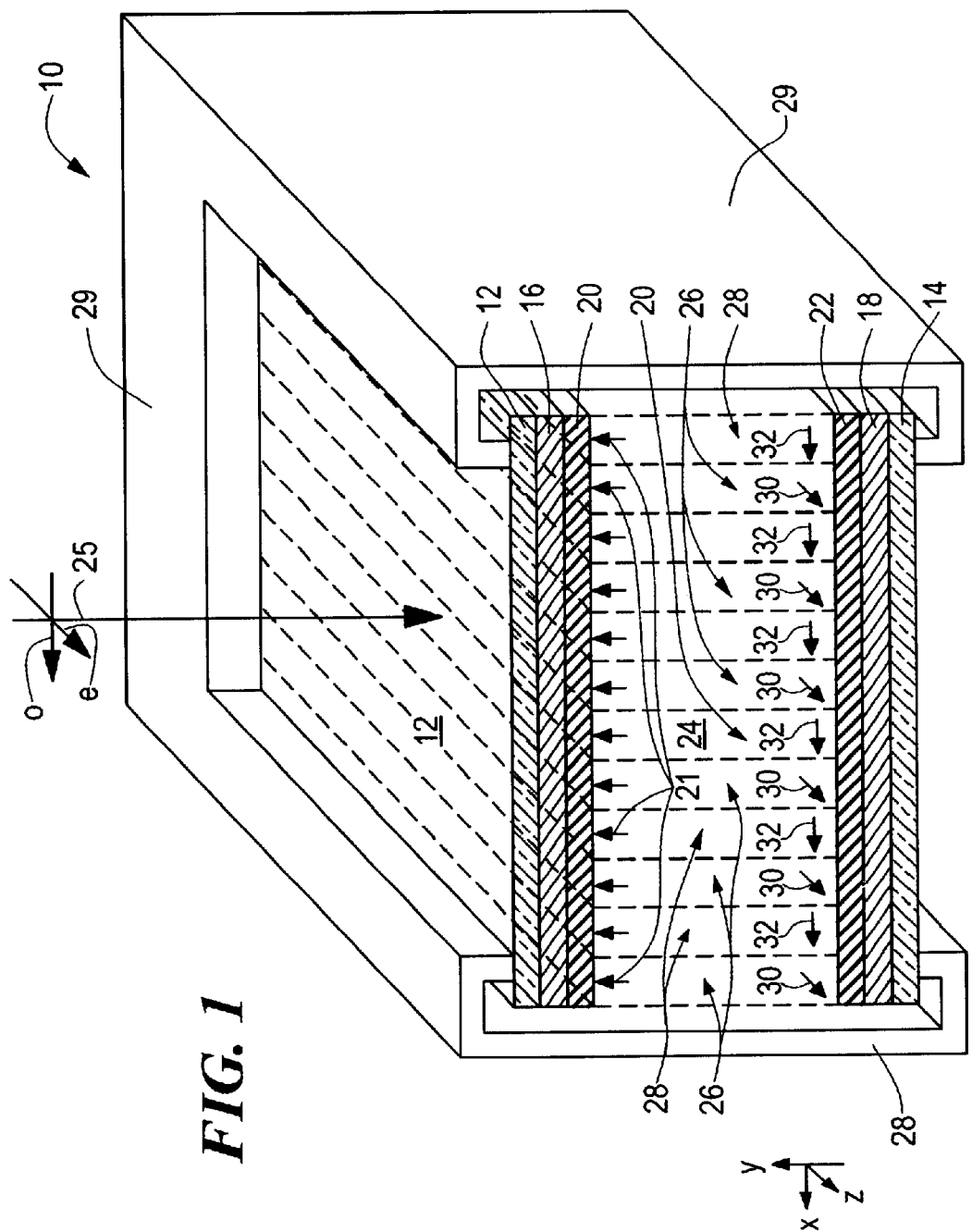
FIG. 1 is an isometric, diagrammatical sketch of an electronically variable light attenuator according to the invention.

Referring now to FIG. 1, an electronically variable light attenuator 10 is shown. The attenuator 10 includes a pair of transparent (i.e., optically transmissive) substrates 12, 14, here planar sheets of glass. Coated onto the inner surfaces of the substrates 12, 14 are layer of electrically conductive and optically transmissive material to provide a pair of transparent electrodes 16, 18. Here, the electrically conductive material may, for example, be evaporated Indium Tin Oxide. Thus, the electrode 16, 18 are on the inner surfaces of transparent substrates 12, 14, respectively. Disposed on the electrodes 16, 18 are layers 20, 22 of a thin polyimide material. Disposed between the layers 20, 22 of polyimide material is a liquid crystal material, or molecules 24. Thus, the space between layers 20, 22 is filled with liquid crystal molecules 24, illustratively long, thin, rod-like organic molecules in the so-called "nematic" phase. The molecules are elongated along a director field axis. The liquid crystal molecules 24 are contained within the attenuator 10 by a housing 29, as indicated.

The polyimide layers 20, 22 are processed to initialize the orientation of the director field axis of the molecules contiguous to the layers 20, 22. Here, the director field axis of the molecules 24 contiguous to the polyimide layer 20, identified by vectors 21, are aligned perpendicular to the surface of the layer 20 (i.e., the vector 21, or elongated molecules 24 contiguous to the layer 20 are aligned along the Y axis; here the direction of the light entering the attenuator 10, such light direction being indicated by arrow 25. Such alignment is a homeotropic alignment. This alignment is obtained by techniques well known in the art.

The director field axis of the molecules 24 contiguous to the inner surface of polyimide layer 22 are arranged as interspersed sets 26, 28. More particularly, the molecules 24 contiguous to the inner surface of layer 22 are arranged in alternating sets; sets 26, 28. The molecules 24 in first set 26 are interspersed with the molecules 24 in the second set 28 thereof. Here, the molecules 24 in the set 26 have their director field axis, represented by arrows 30, disposed parallel to the surface of the polyimide layer 22 and directed out-of-the-plane of FIG. 1. That is, the molecules 24 in set 26 have their director field axis 30 disposed in the X-Y plane and directed along the Z axis shown in FIG. 1. That is, referring to FIG. 1, the inner surfaces of layers 20, 22 (and hence substrates 20, 22 and electrodes 12, 14) are in the X-Z plane and the light is directed along the Y-axis (i.e., along the direction represented by arrow 25).

Considering first the condition where there is no voltage and hence no electric field between the electrodes 12, 14 and hence no electric field between the electrodes 12, 14, the director field axis of the molecules 24 in the second set 28, represented by arrows 32, which are contiguous to the layer 22 are aligned along the X axis shown in FIG. 1 (i.e., the director field axis of the molecules 24 contiguous to the layer 22 in set 28 are orthogonal to the X-Z plane; i.e., the director field axis of the molecules in the set 30 indicated by arrows 32 are directed along the X axis in FIG. 1.

Thus, the electronically variable light attenuator 10 has an array of liquid crystal regions. The regions in a first set 26 thereof are interspersed with the regions in a second set 28 thereof. The area occupied by each set 26, 28 is approximately 50 percent of the total available surface area. The chosen pattern defines the shape of the diffraction pattern (how many beams into what direction with whatever efficiency). The array is adapted to receive a beam of light directed along an axis 25. A pair of electrodes 12, 14 is provided. At least one of the sets 26, 28 is disposed between the pair of electrodes 12, 14. Here, both sets 26, 28 are disposed between the pair of electrodes 12, 14.

Figure 2A:
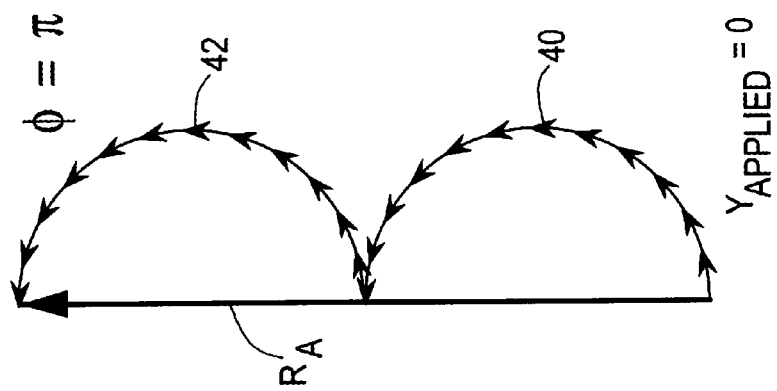
Figure 2:
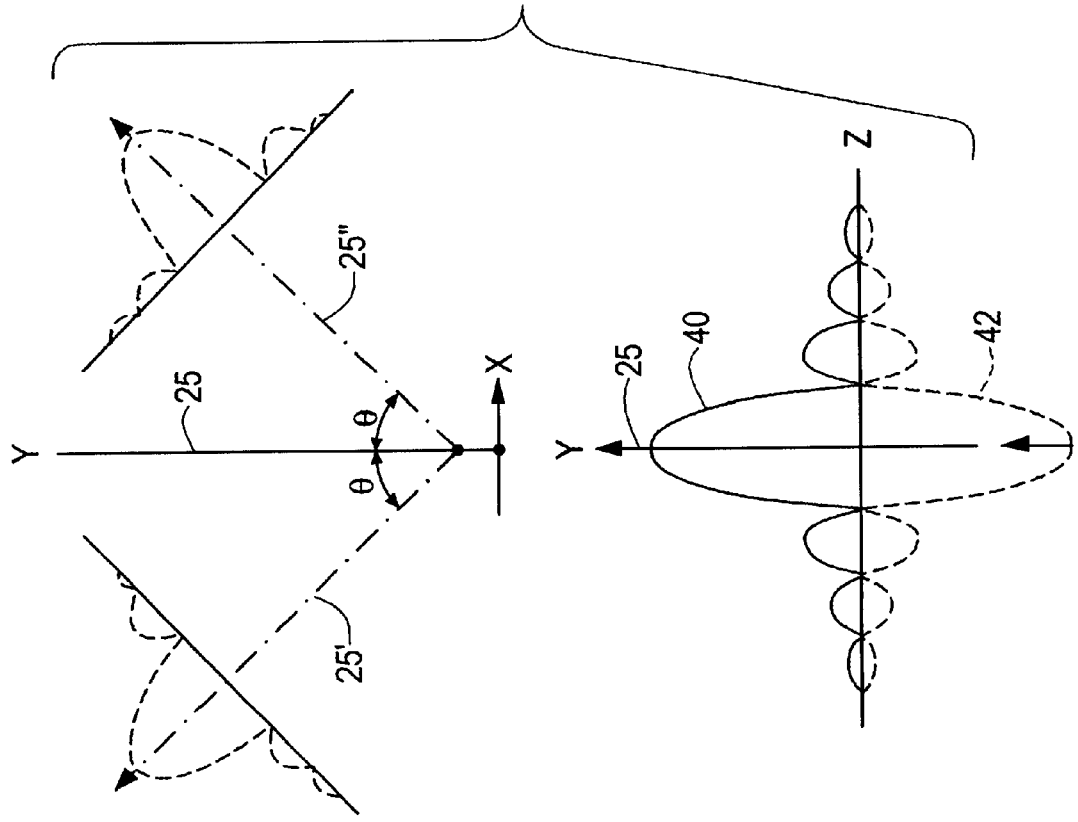
FIG. 2 is a diagram showing diffraction patterns of portions of light passing through the attenuator of FIG. 1, such patterns being shown along various directions under a full voltage condition and a no voltage, fail-safe condition.

Referring now also to FIG. 2, the regions in the first set 26 are configured to produce a first diffraction pattern 40 in response to the received light and the regions in the second set 28 are configured to produce a second diffraction pattern 42 in response to the received light in the absence of an electric field being produced through the sets 26, 28 between the electrodes 12, 14. It is noted that, along the direction of the light (i.e., along the Y-axis or axis 25), the phase of the light passing through the set 26 is $n\pi$ radians out-of-phase with the light passing through the set 28, where n is an odd integer. Thus, in the forward direction and in the absence of the electric field, there is destructive interference between the light passing through set 26 and the light passing through set 28, as in FIG. 2d. It is noted that off the axis 25 there is constructive interference along axis 25', 25"; such axis 25', 25" being at an angle $+/-\theta$ from axis 25, as in FIG. 2.

More particularly, referring again to FIG. 1, consider the light as randomly polarized having an ordinary component o and an orthogonal extraordinary component e, both components being in the X-Z plane. Considering again the case where there is no electric field between the electrodes 12, 14. Considering first the effect of the sets 26, 28 on the ordinary component o, it is noted that the ordinary component o will interact with the molecules in the set 32 with an index of refraction $n_1$ and will interact with the molecules in set 30 with index of refraction $n_0$; where $n_0 < n_1$ and where the total difference in index of refraction $\Delta n = n_1 - n_0$ is $n\pi$. Considering next the effect of the sets 26, 28 on the extraordinary component e, it is noted that the extraordinary component e will interact with the molecules in the set 30 with an index of refraction $n_1$, and will interact with the molecules in set 32 with index of refraction no; where $n_0 < n_1$ and where the total difference in index of refraction $\Delta n = n_1 - n_0$ is $n\pi$. Therefore, referring to FIG. 2, in the Y-Z plane and along the Y axis, and in the absence of an electric field between the pair of electrodes 12, 14, the diffraction pattern 40 of the portion of the light passing through the set 30 will destructive interfere with the diffraction pattern 42 of the portions of the light passing through the set 32, as shown in FIG. 2 and FIG. 2D. It is noted that the maxima of the passing light appears along axis 25', 25" as shown in FIG. 2 and FIG. 2A where such axis 25', 25" are at angles $\pm\theta$ from the Y axis.

Figure 3A:
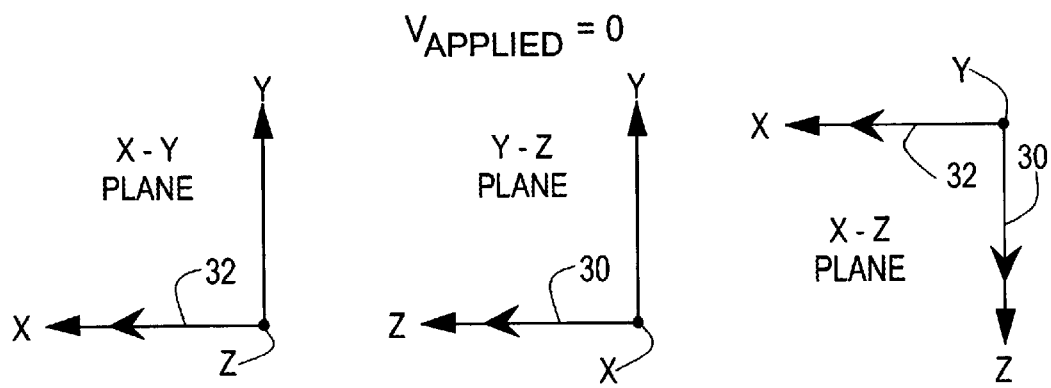
FIGS. 3A–3C are diagrams showing the direction of director field vectors of liquid crystal molecules in the attenuator of FIG. 1 under three different applied voltages.
Figure 3B:
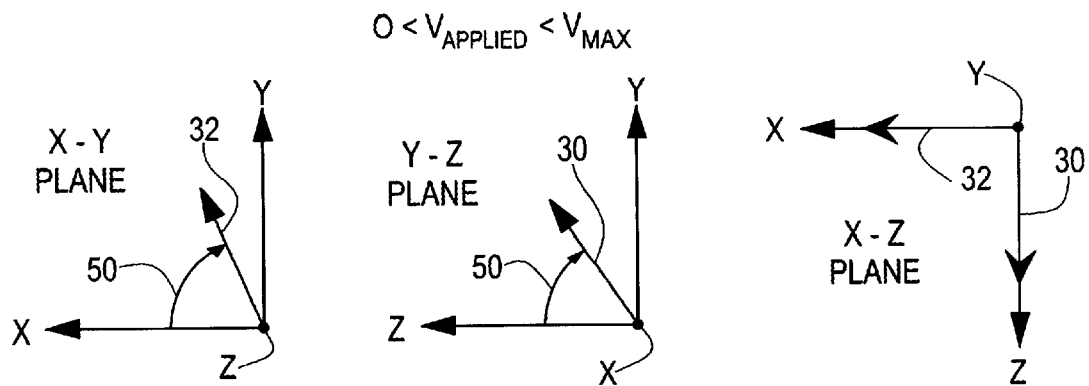
Figure 3C:
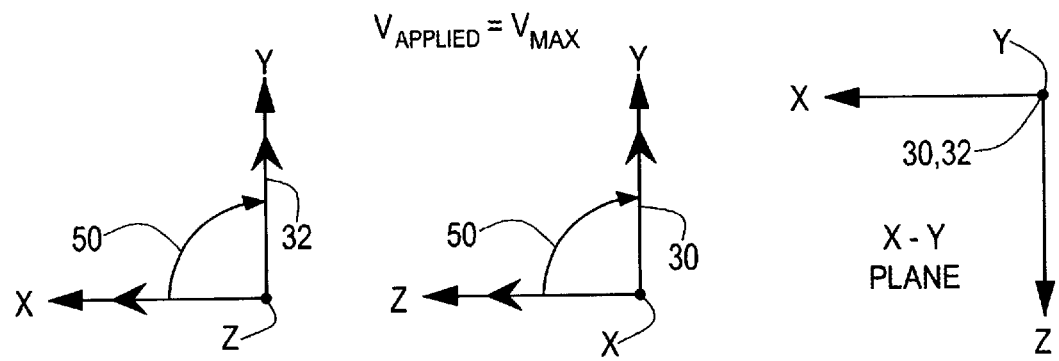

At the other extreme, when full voltage is applied between the electrodes (i.e., $V_{applied} = V_{max}$), the long director field axes of molecules 26 and 28 rotate towards the Y axis, as indicated in FIG. 3C. More particularly, in such electric field condition, the vector 32 rotates in the X-Y plane in the direction of arrow 50 from along the X-axis to along the Y-axis. Likewise, in such electric field condition, the vector 30 rotates in the Y-Z plane in the direction of arrow 52 from along the Z-axis to along the Y-axis. (The vectors 30, 32 in the intermediate case, $V_{MAX} > V_{APPLIED} > 0$ are shown in FIG. 3B, while the condition of zero applied field, $V_{APPLIED} = 0$ is shown in FIG. 3A.) Thus, in the maximal electric field condition, the director field axes of all volume molecules are aligned along the Y axis, there is zero resulting phase difference across all regions, and the diffracted light components 40, 42 along the direction of light propagation interfere constructively, as shown in FIG. 2F, while the off-axis components interfere destructively as shown in FIG. 2C.

The condition where full voltage is applied to the electrodes, 12, 14 and that the light is randomly polarized having an ordinary component o and an orthogonal extraordinary component e, both components being in the X-Z plane will now be considered. Considering first the effect of the sets 26, 28 on the ordinary component o, it is noted that the ordinary component o will interact with the molecules in the set 32 with an index of refraction no and will interact with the molecules in set 30 with index of refraction $n_0$. Considering next the effect of the sets 26, 28 on the extraordinary component e, it is noted that the extraordinary component e will interact with the molecules in the set 30 that are also aligned with the Y axis with an index of refraction no and will interact with the molecules in set 32 with index of refraction $n_0$. Thus, $\Delta n=0$, and the resultant phase shift is zero for ordinary and extraordinary components o and e.

Reference is also made to FIGS. 2A–2F. Referring now to FIG. 2C, such FIG. 2C shows the condition where there is a phase shift $\phi=0$ across regions 26, 28 due to $V_{APPLIED}=V_{MAX}$. Thus, there is a zero resultant optical field along the off-axis directions 25' and 25" as shown in FIG. 2C and maximal optical field along direction 25 (Y-axis) as shown inn FIG. 2F. The condition where the phase shift across the regions 26, 28 is $0<\phi<\pi$ (i.e., $V_{MAX}>V_{APPLIED}>0$) has components 40 and 42 add up partially to give non-zero resultant optical fields both along the off-axis directions 25' and 25" (FIG. 2B) and along the propagation direction 25 (FIG. 2E), as indicated by the thick solid arrows $R_B$ $R_E$, respectively. The case of a maximal phase shift $\phi=\pi$ (i.e., $V_{APPLIED}=0$) is shown in FIG. 2A for the off-axis directions 25' and 25", where there is maximal resultant optical field, $R_A$, and in FIG. 2D for the propagation direction 25, where there is zero resultant optical field, $R=0$.

Figure 4:
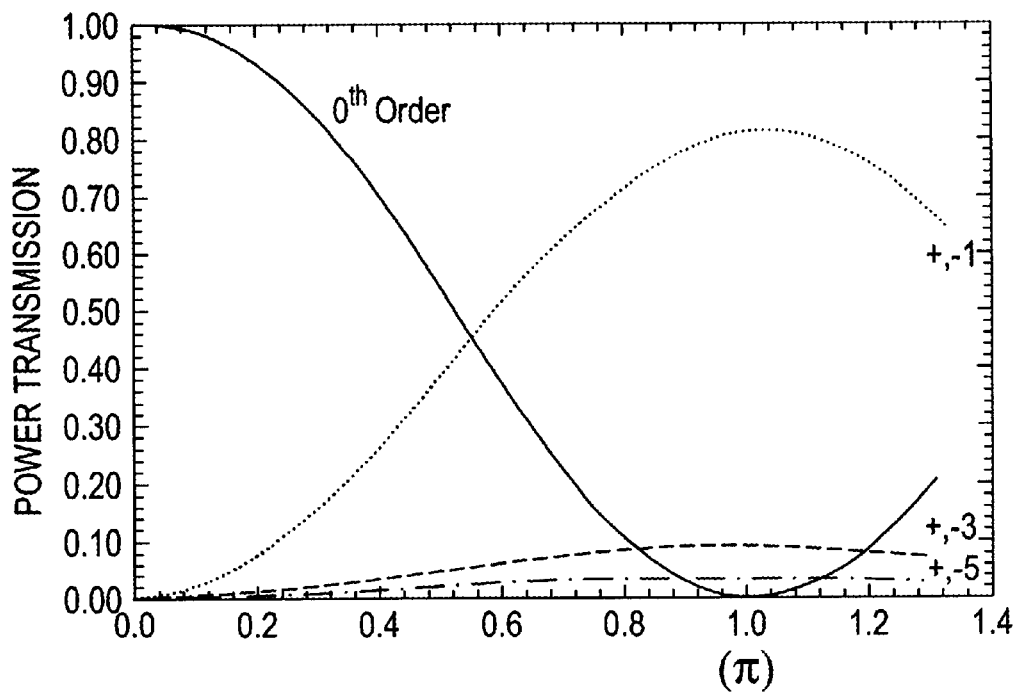
FIG. 4 is a linear scale plot showing the relationship between power transmission passing through the attenuator of FIG. 1 as a function of phase difference of light between different portions of the attenuator of FIG. 1 in units of $\pi$.
Figure 5:
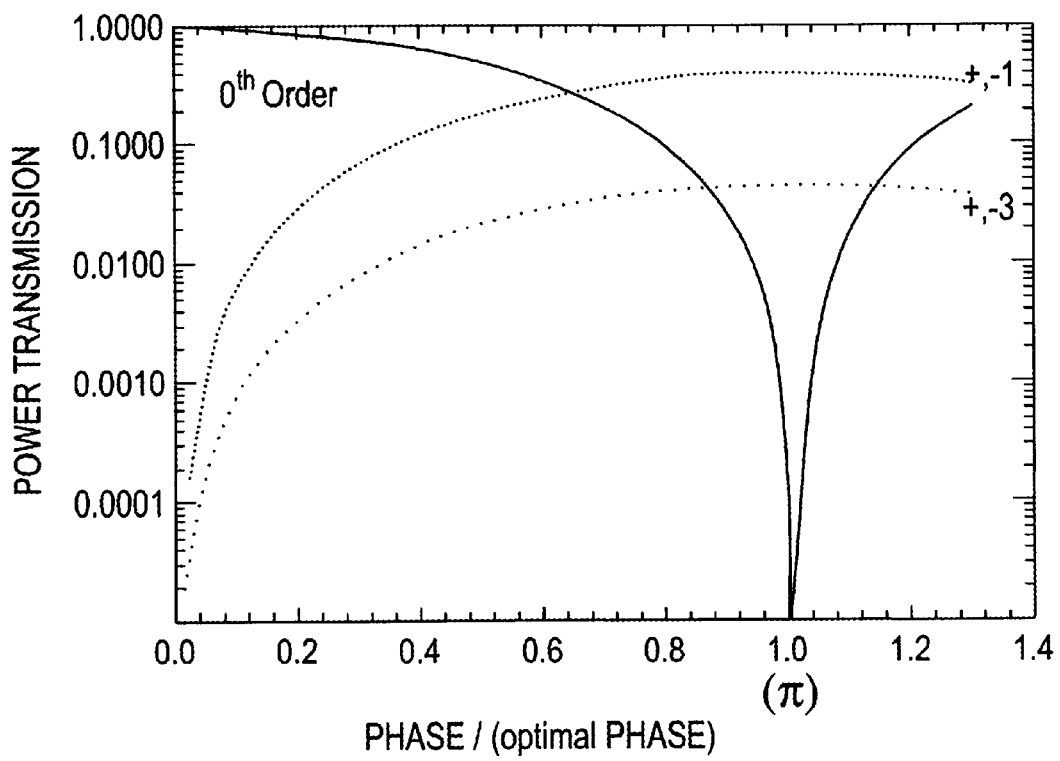
FIG. 5 is a logarithmic scale plot showing the relationship between power transmission passing through the attenuator of FIG. 1 as a function of phase difference of light between different portions of the attenuator of FIG. 1, in units of $\pi$.

The optical field vector R results from constructive interference of all radiating elements in sets 40 and 42. The sum of the resultant optical intensity (proportional to the square of the length of arrow R) for the two off-axis directions 25' and 25" is plotted as the dotted curve in FIGS. 4 and 5. The resultant optical intensity in the propagation direction 25 (Y-axis) is plotted as the solid curve in FIGS. 4 and 5. It is noted that the on-axis optical intensity varies continuously as a function of phase shift, i.e., as $V_{APPLIED}$ is changed from 0 to $V_{MAX}$ volts.

Thus, a little thought will make it apparent that the pair of electrodes 12, 14 are arranged to enable the first and second diffraction patterns 40, 42 to combine with a degree of interference along the Y axis selected in accordance with an electric field produced between the pair of electrodes 12, 14.

To put it another way, in operation, the array is adapted to receive a beam of light directed along an axis, here the Y-axis. The regions in the first set 30 are configured to produce a first diffraction pattern 40 in response to the received light and the regions in the second set 32 are configured to produce a second diffraction pattern 42 in response to the received light. An electric field between the electrodes 12, 14 is varied producing the first and second diffraction patterns 40, 42 with a varying degree of interference along the Y axis, as shown in FIG. 2E. The degree of destructive interference produced along the Y-axis is greatest in the absence of the electric field as shown in FIG. 2D, and there is fully constructive interference along the Y-axis at maximum electric field as shown in FIG. 2F.

Thus, with respect to the propagation direction (Y-axis) and for any given wavelength of light, the attenuator 10 functions properly as an electronically variable, "neutral-density" filter. The light diffracted into the two off-axis directions 25' and 25" and higher orders (at angles $\pm\theta$, $\pm3\theta$, $\pm5\theta$, etc.) is directed into an absorbing beam dump. The attenuator 10 provides high-power handling capability, because the aperture may be scaled up to lower the energy density as needed. As described, the attenuator 10 utilizes the simplest possible phase shift grating pattern that is an on/off phase pattern of equal width provided by alternating regions 30 and 32. The attenuator 10 functions for unpolarized light, because when region 30 presents a phase shift relative to region 32 for one polarization, region 32 relative to region 30 presents an equivalent phase shift for the orthogonal polarization. Hence, the degree of interference produced is independent of the polarization of the received light.

Figure 6A:
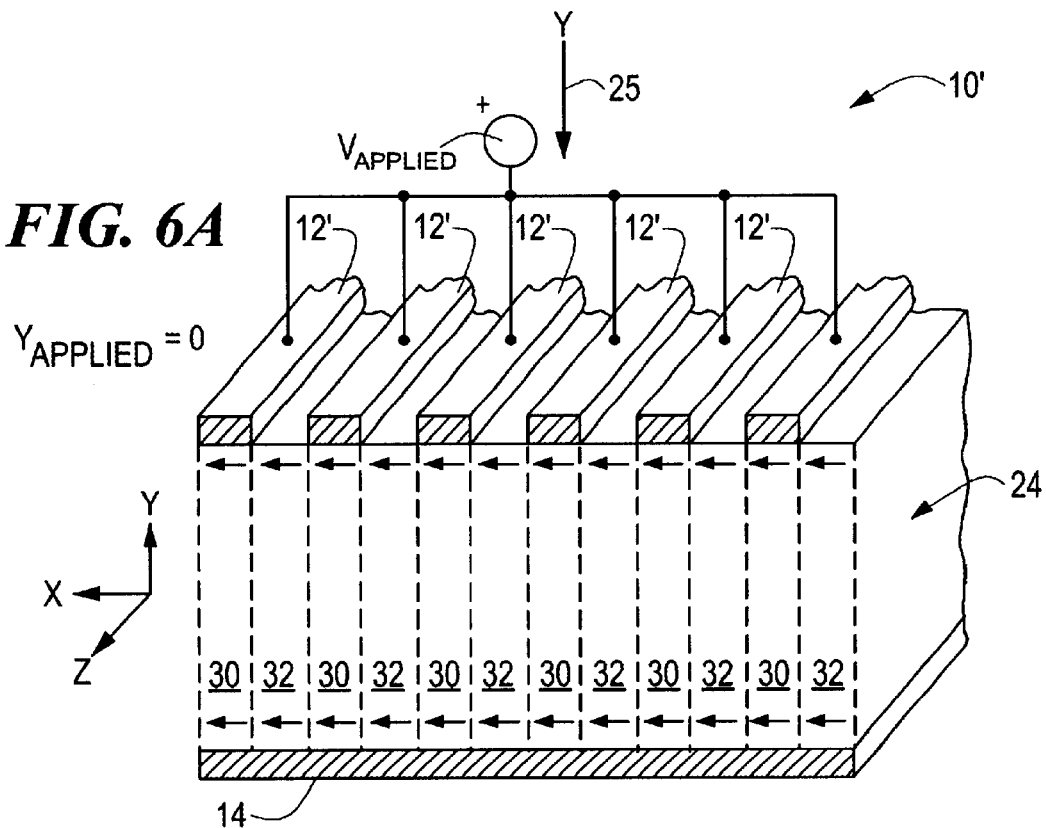
FIGS. 6A and 6B show an electronically variable light attenuator according to another embodiment of the invention, FIG. 6A showing such attenuator with a zero applied electric field and FIG. 6B showing the attenuator with a maximum applied electric field.
Figure 6B:
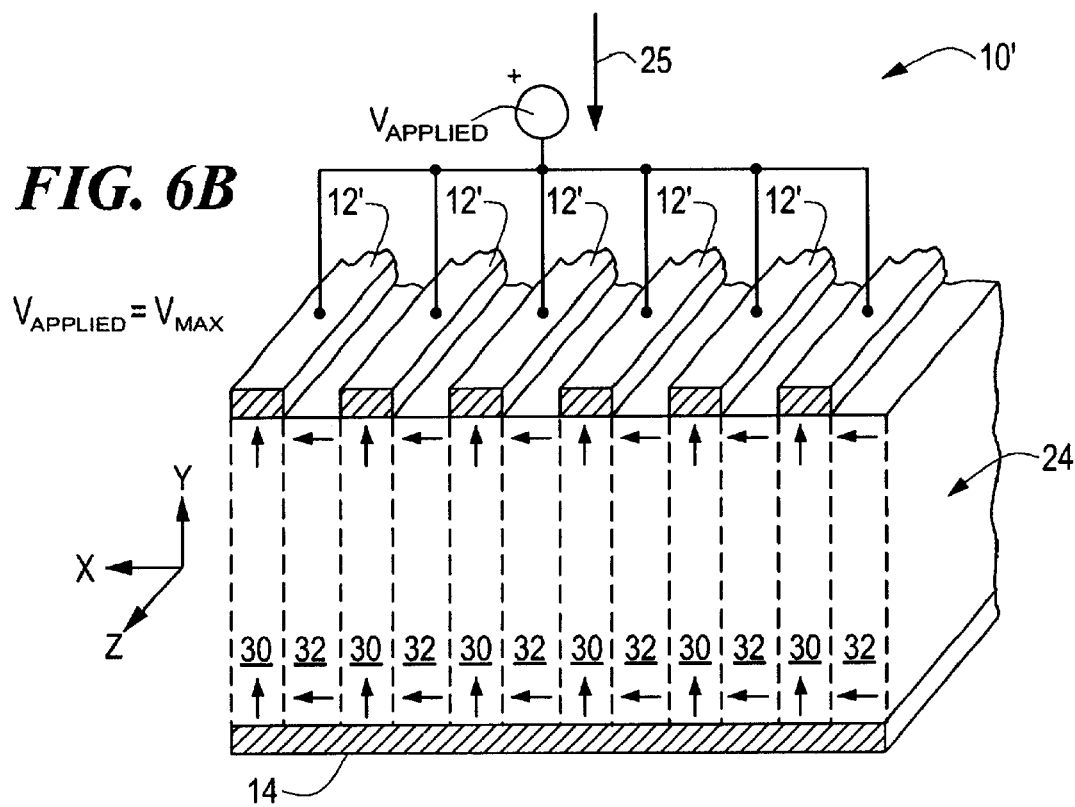

For example, referring now to FIGS. 6A and 6B, another electronically variable attenuator 10' is shown, which requires polarized light. The light is directed along the Y-axis and linearly polarized along the X-axis as shown in FIG. 6. Here again the liquid crystal molecules 24 are arranged in two interleaved sets 30, 32 that are apparent under the influence of an electric field in FIG. 6B. Without an applied electric field, the sets 30 and 32 have identical alignment in the X-Z plane parallel to the X-axis, resulting in zero net phase shift as shown in FIG. 6A. Uniform phase results in maximal intensity along the propagation direction (Y-axis) and zero intensity diffracted into off-axis directions. (The constructive and destructive interference for $\phi=0$ is the same as shown in FIG. 2F and FIG. 2C, respectively; note, however, that the voltage levels indicated in FIGS. 2A–F pertain only the case of attenuator 10 not attenuator 10' discussed in this and later paragraphs.) There is one electrode 14 over the bottom region of the molecules 24 and there are spaced electrodes 12' over only one of the sets 30, 32 of molecules 24; here, over the set 30 of the molecules 24. The spaced electrodes 12' are connected to a positive (+) potential of a variable voltage source, V, and the electrode 14 is connected to the negative (−) potential of such voltage source V. As the voltage is applied, the director axis of LC molecules under the electrodes, i.e., set 30, will rotate in the X-Y plane from the X-axis alignment at $V_{APPLIED}=0$ upward toward the Y-axis; at $V_{APPLIED}=V_{MAX}$ the set 30 will be aligned parallel with the Y-axis, resulting in an effective refractive index $n_0$. Set 32 remains unaltered (since there is no electric field present) with X-axis alignment parallel to the polarization, giving index $n_1$ for set 32. The condition $V_{APPLIED}=V_{MAX}$ is shown in FIG. 6B, where the total difference in index of refraction $\Delta n=n_1-n_0$ results in a relative phase shift $\pi$ or odd multiples thereof. At $V_{APPLIED}=V_{MAX}$, the condition $\phi=\pi$ results in zero intensity along the propagation direction (Y-axis) and maximal intensity diffracted into off-axis directions (corresponding to FIGS. 2D and 2A, respectively). Thus, there is an array of liquid crystal regions 30, 32. The regions in a first set (i.e., regions 30) are interspersed with regions in a second set (i.e., regions 32). Further, at least one of the sets of regions 30, 32 is disposed between a pair of the electrodes 12' (i.e., the region 30 is disposed between the pair of electrodes 12'). The regions in set 30 are configured to produce a first diffraction pattern in response to the received light and the regions in set 32 are configured to produce a second diffraction pattern in response to the received light.

A device utilizing nematic liquid molecules with standard alignment nearly parallel to the device surface (homogeneous alignment) is a polarization sensitive device; i.e., the effective index of refraction is largest when the light polarization vector is parallel to the long axis of the liquid molecules (the director field axis). The polarization properties of attenuator 10' are therefore strictly a function of the director field orientation of regions 30, 32 (and are independent of the layout of the electrode pattern 12' in FIG. 6). In order to make attenuator 10' function with unpolarized light, two devices can be used with orthogonal director field axes regions, for example, regions 30, 32 parallel to the X-axis of FIG. 6A in the first device and regions 30, 32 parallel to the Z-axis of FIG. 6A in the second device.

Referring now to FIG. 7, another electronically variable attenuator 10" is shown, also suitable for linearly polarized light. Without an applied voltage, the director field axis of the liquid crystal molecules 24 may have arbitrary, but uniform orientation. (A figure for $V_{APPLIED}=0$ is not shown.) Application of a voltage produces again the sets 30, 32 of liquid crystal molecules 24 interleaved as shown. Here the spaced electrodes 12" are connected to the −potential of the applied voltage and the electrodes 14" are connected to the +potential of the applied voltage. The electric field lines thereby produced between the adjacent pairs of electrodes is indicated by the arrows 100. The resulting director field axes of molecules 24 are shown by the arrows 102. It is noted that the resulting director field axes under the pairs of adjacent electrode 12", 14" are in opposing, vertical orientations, parallel to the Y-axis, i.e., one is up and the other is down with an effective index of refraction $n_0$ for light propagating along the Y-axis. The resulting director field axes in the regions between pairs of adjacent electrodes 12", 14" are horizontal, parallel to the X-axis, i.e., one is to the left and one is to the right with effective index $n_1$ for linearly polarized light along the X-axis. Thus, there is an array of liquid crystal regions 30, 32. The regions in a first set (i.e., regions 30) are interspersed with regions in a second set (i.e., regions 32). Further, at least one of the sets of regions 30, 32 is disposed between a pair of the electrodes 12", 14" (i.e., the regions 32 are disposed between the pair of electrodes 12", 14"). The regions in set 30 are configured to produce a first diffraction pattern in response to the received light and the regions in set 32 are configured to produce a second diffraction pattern in response to the received light.

The polarization properties of attenuator 10" are strictly a function of the layout of the electrode pattern 12", 14" in FIG. 7 (and are independent of the zero-voltage director field orientation of molecules 24). In order to make attenuator 10" function with unpolarized light, two orthogonal electrode patterns can be used on a single cell, for example, a first electrode pattern 12", 14" parallel to the Z-axis on the upper cell surface (as drawn in FIG. 7) and an equivalent second electrode pattern (not shown in FIG. 7) parallel to the X-axis on the lower cell surface.

Referring now to FIG. 8, another light attenuator 10'" is shown. Here, the attenuator 10'" has sets of a plurality of, here four, electrodes $12a_1$–$12a_4$; $12b_1$–$12b_4$, ... repeated periodically along the upper surface of the liquid crystal 24, and a common reference electrode 14'" on the lower surface as indicated in FIG. 8A. The voltage, $V_{APPLIED}$, is fed directly to the first electrode in each set (i.e., electrodes $12a_1$, $12b_1$, ... ), giving rise to a first component of molecules 24 with orientation $30a_1$, $30b_1$, ... of the director field. The voltage, $V_{APPLIED}$, is fed to the second electrode in each set (i.e., electrodes $12a_2$, $12b_2$, ... ) through a first voltage increment $+\Delta V$, giving rise to a second component of molecules 24 with orientation $30a_2$, $30b_2$, ... of the director field. The voltage, $V_{APPLIED}$, is fed to the third electrode in each set (i.e., electrodes $12a_3$, $12b_3$, ... ) through a second voltage increment $+2\Delta V$, giving rise to a third component of molecules 24 with orientation $30a_3$, $30b_3$, ... of the director field. And, the voltage, $V_{APPLIED}$, is fed to the fourth electrode in each set (i.e., electrodes $12a_4$, $12b_4$, ... ) through a third voltage increment $+3\Delta V$, giving rise to a fourth component of molecules 24 with orientation $30a_4$, $30b_4$, ... of the director field. Thus, the voltage across the four electrodes in each set is a four-step incremental voltage, producing a four-level-quantized, ramp-like phase variation $\phi$ across the molecules 24 under each one of the sets ($SET_1$, $SET_2$, ... ), as indicated in FIG. 8B. It is noted therefore that each one of the sets ($SET_1$, $SET_2$, ... ) includes a plurality of subsets (i.e., $30a_1$, $30a_2$, $30a_3$ and $30a_4$, for set $SET_1$, subsets $30b_1$, $30b_2$, $30b_3$ and $30b_4$, for set $SET_2$, etc.).

With such a ramp-like phase $\phi$ only one dominant diffracted output beam is produced, and such beam is produced at an angle $+\theta$ off of the direction of the incoming light beam. Thus, referring to FIG. 8C, when the applied voltage is zero, the incident light I passes along an axis 26 (i.e., perpendicular to the surface 102 of the attenuator 10'" (FIG. 8A)). However, when there is an voltage applied to the attenuator 10'", resulting in the ramp-like phase $\phi$ shown in FIG. 8B, the incident light is split to exit also along axis 27, as indicated in FIG. 8C.

Figure 9B:
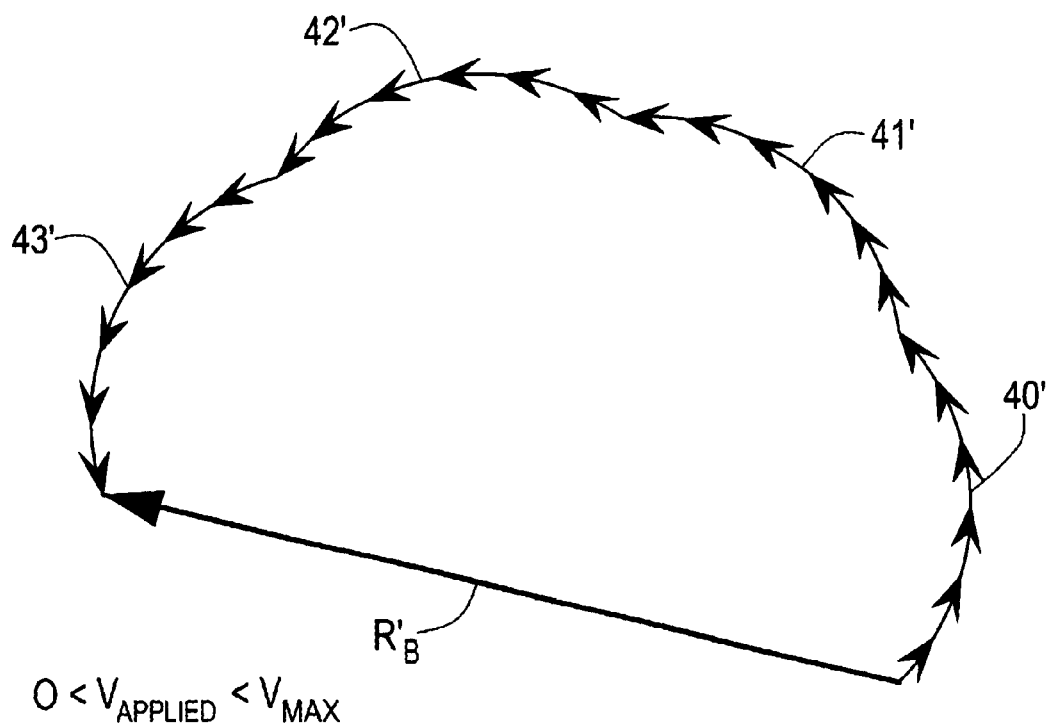
Figure 9D:
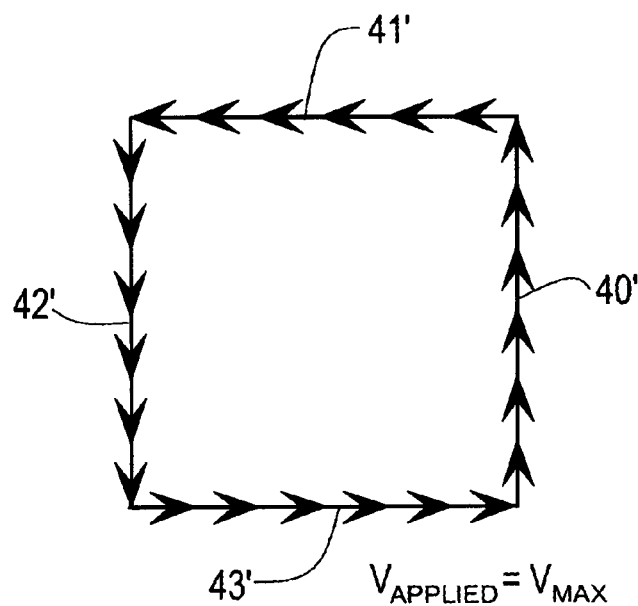

Referring now to FIG. 9 (which depicts the four-level case analogous to the two-level case depicted in FIGS. 2A–F), the optical field contribution of regions $30a_1$, $30b_1$, ... in sets $SET_1$, $SET_2$, ... coherently add to give a first optical field component denoted by 40'. The optical field contribution of regions $30a_2$, $30b_2$, ... in sets $SET_1$, $SET_2$, ... coherently add to give a second optical field component denoted by 41' in FIG. 9. The optical field contribution of regions $30a_3$, $30b_3$, ... in sets $SET_1$, $SET_2$, ... coherently add to give a third optical field component denoted by 42' in FIG. 9. And the optical field contribution of regions $30a_4$, $30b_4$, ... in sets $SET_1$, $SET_2$, ... coherently add to give a fourth optical field component denoted by 43'. In the example of FIG. 9, the four sets of components are configured to produce diffraction patterns in response to the received light into the directions 26, 27 (FIG. 8C) according to the voltage applied to the electrode sets $SET_1$, $SET_2$, ... as follows: When $V_{APPLIED}=V_{MAX}$ (where $V_{MAX}=V_{MX}+3\Delta V_{MX}$) and considering the off-axis direction 27, the four optical field components 40',41', 42', and 43' interfere constructively to give the largest off-axis field vector $R'_A$ as shown in FIG. 9A, while in the propagation direction 26 at the same voltage these four components add destructively R=0 as shown in FIG. 9D. When $V_{APPLIED}=0$ and again considering the off-axis direction 27, the four optical field components 40',41', 42', and 43' interfere destructively to give R=0 as shown in FIG. 9C, while in the propagation direction 26 at $V_{APPLIED}=0$ these four components add constructively to give the full input intensity I (proportional to $R^2$) as shown in FIG. 9F. The case of $0<V_{APPLIED}<V_{MAX}$ is illustrated for directions 27 and 26 in FIGS. 9B and 9E, respectively. Thus, the electrodes are arranged to enable the diffraction patterns to combine with a degree of interference along the axis selected in accordance with an electric field produced through the each set of liquid crystal regions disposed between respective pairs of electrodes. The regions comprise liquid crystal molecules oriented along a director field axis. In the absence of an electric field, the director field axes of the molecules in the sets are all oriented parallel in a plane orthogonal to the light propagation.

The polarization properties of attenuator 10'" are strictly a function of the director field orientation of regions $30a_i$, $30b_i$, ... (and are independent of the layout of the electrode pattern $12a_i$, $12b_i$, ... in FIG. 8A). In order to make attenuator 10'" function with unpolarized light, two devices can be used with orthogonal director field axes regions as described for attenuator 10'.

Figure 10A:
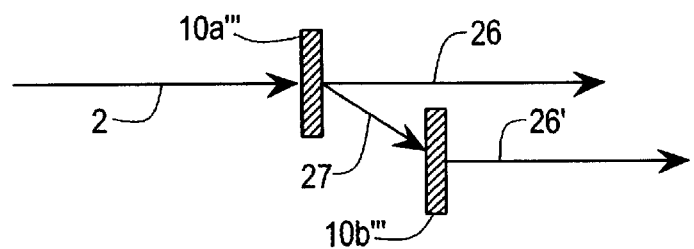
FIG. 10A is a diagram of an electronically controllable light attenuator system utilizing two attenuator according to FIG. 8.
Figure 10B:
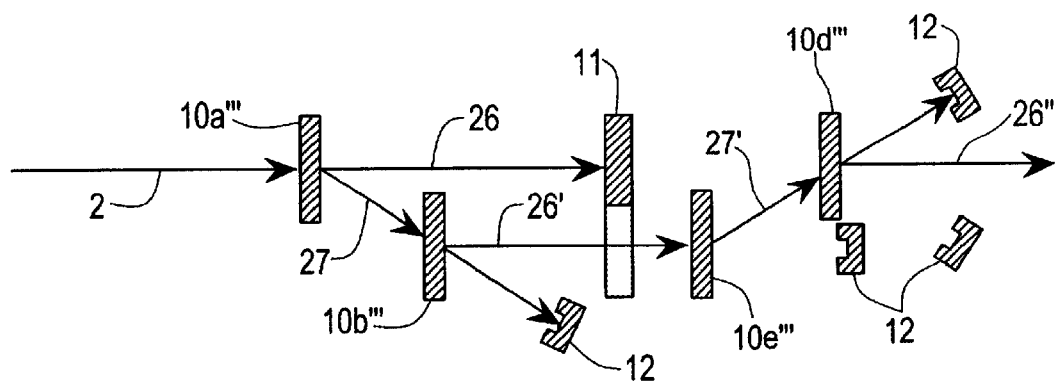
FIGS. 10B and 10C are diagrams of an electronically controllable light attenuator system utilizing four attenuators according to FIG. 8
Figure 10C:
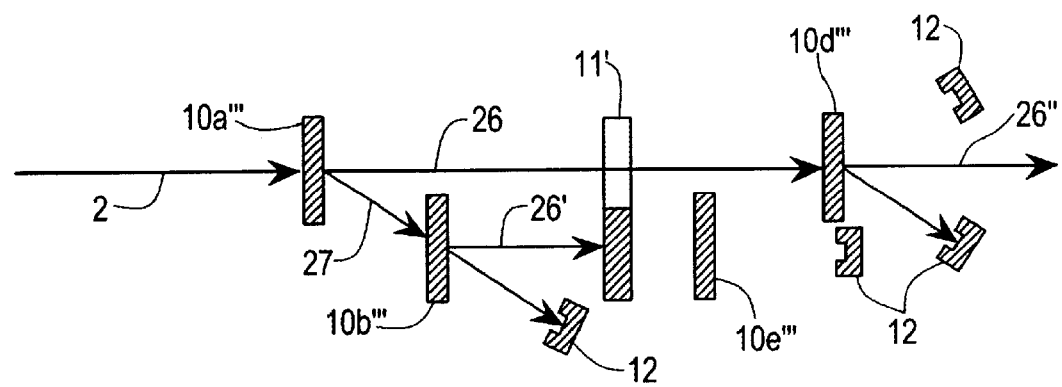

Attenuator 10'" can attain high diffraction efficiency by using more than the four phase quantization levels described in the previous example. High diffraction efficiency affords the alternate choice of using the diffracted off-axis beam as the attenuated working beam instead of the beam propagating on axis. The off-axis mode of operation gives inherent fail-safe operation, since there is zero off-axis beam intensity with $V_{APPLIED}=0$. In order to maintain the direction of the attenuated working beam parallel to the input beam direction (26 of FIG. 10A), two attenuators, 10a''' and 10b''', can be positioned in series, where the first device diffracts the working beam into the off-axis direction (27 of FIG. 10A) and the second device receives the beam from the off-axis direction, transmitting it out parallel to the input direction (26' of FIG. 10A). Four attenuators of type 10''' in series can be configured to maintain the input beam axis direction for the attenuated output beam (i.e, the output beam propagates on the same axis as the input beam) by having the beam follow a planar, tetrahedral-shaped beam deflection path as drawn in FIGS. 10B and 10C. Adding the switchable beam block 11, 11' within the beam path of the four-attenuator configuration permits the alternate use of off-axis (FIG. 10B) or on-axis mode of attenuation (FIG. 10C).

Figure 11:
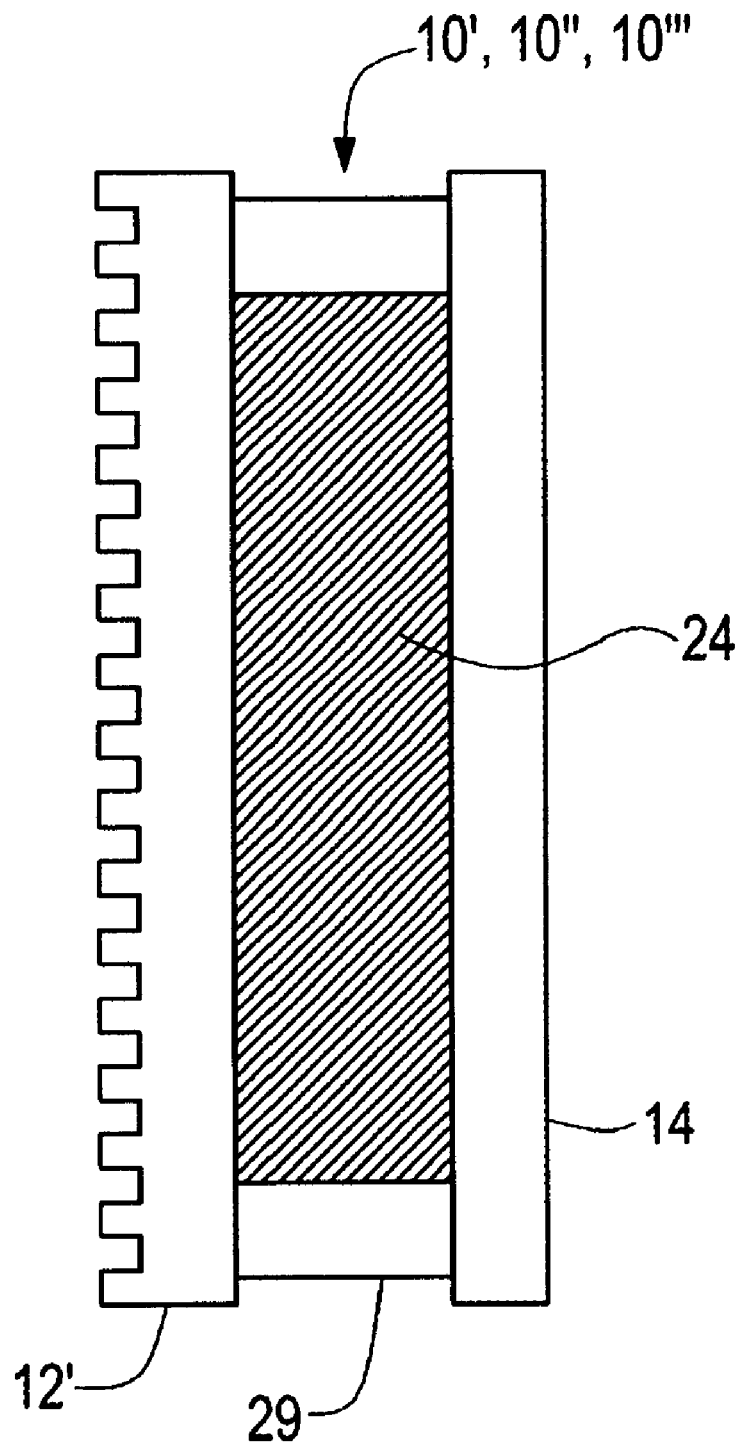
FIG. 11 is a diagram of an electronically controllable light attenuator according to FIG. 6, 7, or 8, incorporating a static diffraction grating.

Attenuators 10', 10'' (and 10''') are not fail-safe in the on-axis direction (26 of FIG. 10), i.e., the input beam is transmitted unattenuated for $V_{APPLIED}=0$. For fail-safe operation, a binary diffraction grating can be etched into the substrate 12' as shown in FIG. 11. The design of such a binary grating is well known in the art. Matched to the diffraction angle of the electronically variable grating, the static grating can be fully compensated by the variable grating. This precaution would not be suitable for the attenuator 10''' in the off-axis mode of operation described in the previous paragraph.

It will be obvious to one of skill in the art that polarization insensitivity for attenuators 10', 10'', and 10''' can be achieved by further modifications to the configurations that having been described before.

Although the liquid crystal molecules discussed herein employ nematic liquid crystal molecules which align parallel to an applied electric field (similar to the liquid crystal BHD E7), there are other liquid crystal types of opposite anisotropy, which align perpendicular to an applied field. It will be obvious to one of skill in the art to substitute these or other liquid crystal types and make the appropriate modifications of beam polarizations and liquid crystal alignment layers so as to produce an attenuator that accords with the principles of the present invention.

Other embodiments are within the spirit and scope of the appended claims.

What is claimed is:

1. An electronically variable light attenuator, comprising:
    an array of liquid crystal regions, the regions in a first set thereof being interspersed with the regions in a second set thereof, such array being adapted to receive a beam of light directed along an axis;
    a pair of electrodes, at least one of the sets of liquid crystal regions being disposed between the pair of electrodes, such pair of electrodes being disposed along a common surface of the array of liquid crystal regions to produce an electric field having components disposed parallel to such common surface;
    wherein the regions in the first set are configured to produce a first diffraction pattern in response to the received light and the regions in the second set are configured to produce a second diffraction pattern in response to the received light; and
    wherein the pair of electrodes are arranged to enable the first and second diffraction patterns to combine with a degree of interference along an axis selected in accordance with an electric field produced through the at least one of the sets liquid crystal regions disposed between the pair of electrodes.

2. An electronically variable light attenuator, comprising:
    an array of liquid crystal regions, the regions comprising a plurality of sets thereof, each one of the sets having a plurality of subsets of the regions, such subsets being interspersed within the set thereof, such array being adapted to receive a beam of light directed along an axis;
    a pair of electrodes, at least one of the sets of liquid crystal regions being disposed between the pair of electrodes;
    wherein the regions in the subsets of each set thereof are configured to produce a corresponding diffraction pattern in response to the received light; and
    wherein the pair of electrodes are arranged to enable the corresponding diffraction pattern of the subsets combine with a degree of interference along an axis selected in accordance with an electric field produced between the pair of electrodes.

3. The attenuator recited in claim 1 wherein the degree of interference is greatest in the absence of the electric field.

4. The attenuator recited in claim 1 wherein the degree of interference is independent of the polarization of the received light.

5. The attenuator recited in claim 4 wherein the degree of interference is greatest in the absence of the electric field.

6. The attenuator recited in claim 1 wherein the regions comprise molecules, such molecules being elongated along a director field axis, and wherein the director field axis of the molecules in the first set is orthogonal to the director field axis of the molecules in the second set.

7. The attenuator recited in claim 6 wherein the director field axis of the molecules in the first set and the director field axis of the molecules in the second set are both orthogonal to the direction of the received light.

8. The attenuator recited in claim 1 wherein the regions in the first set provide an $n\pi$ phase shift to the received light relative to the phase shift provided to the received light by the regions in the second set, where n is an odd integer.

9. The attenuator recited in claim 1 wherein the regions in the first set provide an $n\pi$ phase shift to the received light relative to the phase shift provided to the received light by the regions in the second set, where n is an odd integer in the absence of an electric field between the pair of electrodes.

10. A method for electronically varying light attenuation, comprising:
    providing a pair of electrodes with at least one set of a first and second set of regions of an array of liquid crystal regions therebetween, such pair of electrodes being disposed along a common surface of the array of liquid crystal regions to produce an electric field having components disposed parallel to such common surface;
    the regions in the first set thereof being interspersed with the regions in the second set thereof, such array being adapted to receive a beam of light directed along an axis, the regions in the first set are configured to produce a first diffraction pattern in response to the received light and the regions in the second set are configured to produce a second diffraction pattern in response to the received light; and
    varying an electric field between the electrodes and passing through the at least one of the sets of regions producing the first and second diffraction patterns with a varying degree of interference along the axis.

11. The method recited in claim 10 wherein the array degree of interference produced is greatest in the absence of the electric field.

12. The method recited in claim 10 wherein the degree of interference produced is independent of the polarization of the received light.

13. The method recited in claim 12 wherein the array degree of interference produced is greatest in the absence of the electric field.

14. The method recited in claim 10 wherein the regions is provided with molecules, such molecules being elongated along a director field axis, and wherein the director field axis of the molecules in the first set is orthogonal to the director field axis of the molecules in the second set in the absence of the electric field.

15. The method recited in claim 14 wherein the director field axis of the molecules in the first set and the director field axis of the molecules in the second set are both oriented orthogonal to the direction of the received light in the absence of the electric field.

16. The method recited in claim 10 wherein the regions in the first set provide an $n\pi$ phase shift to the received light relative to the phase shift provided to the received light by the regions in the second set, where n is an odd integer.

17. The method recited in claim 10 wherein the regions in the first set provide an $n\pi$ phase shift to the received light relative to the phase shift provided to the received light by the regions in the second set, where n is an odd integer in the absence of an electric field between the pair of electrodes.

18. A structure comprising:

an array of liquid crystal regions, the regions in a first set thereof being interspersed with the regions in a second set thereof;

a pair of electrodes, at least one of the sets of liquid crystal regions being disposed between the pair of electrodes, such pair of electrodes being disposed along a common surface of the array of liquid crystal regions to produce an electric field having components disposed parallel to such common surface.

* * * * *